United States Patent [19]

Elberbaum

[11] Patent Number: 5,274,450
[45] Date of Patent: Dec. 28, 1993

[54] METHOD AND APPARATUS FOR CONVERTING SYNCHRONIZING SIGNAL

[75] Inventor: David Elberbaum, Tokyo, Japan

[73] Assignee: Elbex Video Ltd., Tokyo, Japan

[21] Appl. No.: 815,493

[22] Filed: Dec. 31, 1991

[51] Int. Cl.$^5$ .............................................. H04N 5/073
[52] U.S. Cl. ..................... 358/149; 358/150
[58] Field of Search ................... 358/148, 149, 19, 17, 358/150

[56] References Cited

U.S. PATENT DOCUMENTS

| 3,443,024 | 5/1969 | Allen et al. | 358/149 |
| 3,525,808 | 8/1970 | Brown | 358/149 |
| 4,603,352 | 7/1986 | Kaneta et al. | 358/148 |

FOREIGN PATENT DOCUMENTS

| 0798552 | 7/1958 | United Kingdom | 358/149 |
| 2105150 | 3/1983 | United Kingdom | 358/148 |

Primary Examiner—James J. Groody
Assistant Examiner—David E. Harvey
Attorney, Agent, or Firm—Helfgott & Karas

[57] ABSTRACT

In a converting method and apparatus therefor, synchronizing signal is received from an external synchronizing signal generator, which includes a circuit which generates two or more frequency signals, and alternately transmits these signals to the converting apparatus. The apparatus includes a decoder circuit for decoding an alternating rate of the frequency signals, outputted from the external synchronizing signal generator, and generating a new synchronizing pulse signal on the basis of the decoded signal. The new synchronizing pulse signal which has a level higher than the white level or lower than the black level of a composite video signal, generated by the TV camera, is injected into a video transmission line connected to the TV camera for synchronizing the latter on the basis of the injected synchronizing pulse.

5 Claims, 2 Drawing Sheets

METHOD AND APPARATUS FOR CONVERTING SYNCHRONIZING SIGNAL

BACKGROUND OF THE INVENTION

1. Field of the Invention

This invention relates to a method and an apparatus for receiving synchronizing signals from a device for controlling a television camera and converting the received synchronizing signals into a new synchronizing signal.

2. Description of the Prior Art

In a monitor television system used, as one of information transmission systems, at least one television monitor is connected through an electronic switch to a plurality of television cameras and a plurality of transmission lines. The electronic switch provides selection of any one of the television cameras or sequential switching and displaying on the television monitor a picture image of one camera after another.

In such an information transmission system, it is necessary to mutually lock the internal synchronizing signals of a plurality of television cameras to an external synchronizing signal, in order As one of the devices for synchronizing a plurality of television cameras, there is known an apparatus for transmitting a horizontal synchronizing signal and a vertical synchronizing signal used in a television system, from an external synchronizing generator to the television cameras, and driving the television camera by the transmitted horizontal synchronizing signal, and the vertical synchronizing signal, or the composite synchronizing signal.

Another known apparatus for synchronizing a plurality of television cameras, is an apparatus for transmitting an external synchronizing signal from an external synchronizing generator to the television cameras and locking an internal synchronizing signal generator of the television camera by means of the transmitted external synchronizing signal. Such an apparatus is disclosed in U.S. Pat. No. 4,603,352, the contents of which are incorporated herein by reference.

In any of the above known devices of the type under discussion, as the transmitted synchronizing signal itself is a train of pulses, which can be easily influenced by noise, the transmission of a synchronizing signal requires the use of a coaxial cable with its high shielding effect, which makes it difficult to transmit the synchronizing signal over long distance.

Another apparatus for synchronizing plurality of television cameras is an apparatus for generating two or more frequency signals having frequencies higher than that of the synchronizing signal and different from each other and alternately transmitting the two or more frequency signals to the terminal equipment via low cost twisted pair wires.

The television camera, receives the two or more frequency signals transmitted from the external synchronizing signal generator, decodes the signal in accordance with the alternating rate of the received two or more frequency signals, and synchronizes the camera's internal sync generator on the basis of the decoded signal.

Such an apparatus is disclosed in U.S. patent application Ser. No. 788,987 filed Nov. 7, 1991.

Since the above mentioned synchronizing signals are different, the synchronizing signals transmission methods are different, the apparatuses of this kind are respectively constructed different systems, depending on the synchronizing signals to be used, and are available in markets. Therefore, the instruments to be used are not interchangeable.

SUMMARY OF THE INVENTION

It is therefore an object of the present invention to provide convertibility and interchangeability to the instrument for synchronizing a terminal equipment, wherein, an external synchronizing signal may be propagated through a cheap transmission line over long distances without being influenced by noise.

In a converting method and apparatus according to the present invention, two or more alternately frequency signals having frequencies higher than that of the synchronizing signal and different from each other are received from external synchronizing generator, for synchronizing the television camera. These two or more alternating frequency signals are converted by the apparatus of the present invention into a new frame synchronizing signal.

A converting method according to the present invention comprises the steps of generating, on the basis of the received two or more alternating frequency signals, frame synchronizing pulses having a level higher than the white level or lower than the black level of the a composite video signal generated by the television camera, and injecting the frame synchronizing pulses into a video transmission line connected to the television camera for synchronizing the television camera on the basis of the injected frame synchronizing pulses.

A converting apparatus according to the present invention comprises first signal processing means for receiving the two or more frequency signals transmitted from the external synchronizing signal generator, decoding the signal in accordance with the alternating rate of the received two or more frequency signals, and generating on the basis of the decoded signal a frame synchronizing pulse, and second signal processing means for receiving the pulse signal, and generating, on the basis of the received pulse signal, a frame synchronizing pulse having a level higher than the white level or lower than the black level of the composite video signal generated by the television camera.

The two or more alternating frequency synchronizing signal outputted from the external synchronizing generator for synchronizing the television camera are converted into the frame synchronizing pulse having a predetermined level, and transmitted to the television camera. The converting apparatus according to the present invention is preferably placed at the side of the television camera.

According to the present invention, the television camera synchronized by the frame synchronizing pulse is synchronized by two or more alternating frequency signals transmitted over a long distance by using low cost transmission line such as a twist pair cable.

In addition, according to the present invention, as the frame synchronizing pulse has the level higher than the white level or lower than the black level of the composite video signal, the frame synchronizing pulse is transmitted by the use of a transmission line for the video signal transmitted from the television camera to the television monitor.

In an embodiment, the converting apparatus according to the present invention further comprises third signal processing means for receiving a video signal transmitted from the television camera and injecting the frame synchronizing pulse into the received video signal. Since the television camera internal synchronization of vertical drive and blanking is synchronized and locked with the injected frame synchronizing pulse, the frame synchronizing pulse presence in the video transmission line is within the period corresponding to the vertical blanking interval in the composite video signal. In this step, the frame synchronizing pulse is transmitted by the use of the transmission line for the video signal without affecting the video signal transmitted from the television camera.

In an embodiment, the converting apparatus according to the present invention further comprises fourth signal processing means for receiving a signal outputted from the third signal processing means, and removing the frame synchronizing pulse from the received signal. Therfore the picture image reproduced on the television monitor is not influenced by the frame synchronizing pulse.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF PREFERRED EMBODIMENT

Figure 1:
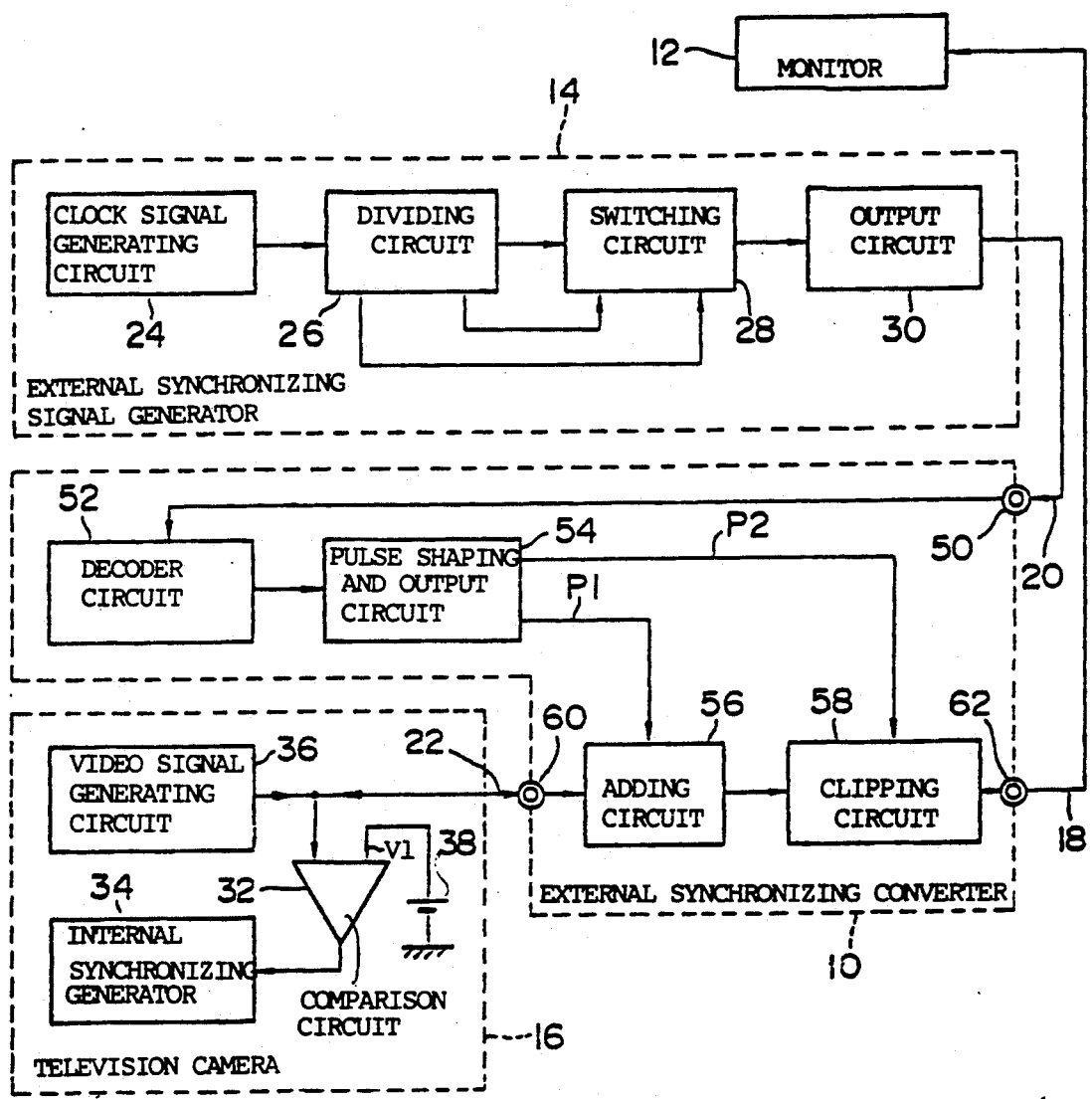
FIG. 1 is a block diagram of an electric circuit of a television system using a synchronizing signal converting apparatus of a preferred embodiment of the present invention.

Referring to FIG. 1, an external synchronizing converter apparatus 10 is placed at the side of a television camera 16 as an apparatus for receiving the alternating frequency synchronizing signal transmitted from the external synchronizing signal generator 14, placed where a television monitor 12 is installed, and converting the received alternating frequency signal into a signal for synchronizing the television camera 16.

The television monitor 12 and the external synchronizing signal generator 14 are connected to the synchronizing signal converting apparatus 10 through cables 18 and 20, respectively. The television camera 16 is connected to the external synchronizing signal converting apparatus 10 through a cable 22.

The external synchronizing signal generator 14 comprises a clock signal generating circuit 24 for generating a clock signal having a constant frequency, a dividing circuit 26 for generating a switching signal shown in FIG. 2(A) and first and second low-frequency signals shown in FIGS. 2(B) and 2(C) by dividing the clock signal received from the clock signal generating circuit 24, a switching circuit 28 for generating a signal shown in FIG. 2(D) by repeatedly switching the first and second low-frequency signals received from the dividing circuit 26 by the use of the switching signal shown in FIG. 2(A) received from the dividing circuit 26, and an output circuit 30 for transmitting the output signal from the switching circuit to the external synchronizing converter apparatus 10 through the cable 20.

The switching signal shown in FIG. 2(A) is related to the vertical scanning frequency of the television camera 16, and also has a duty cycle of 50%. The first and second low-frequency signals have a frequency of less than 30 KHz, preferably of audio frequency band. The low frequency signals do not require coaxial cable for propagation and are less influenced by noises, and therefore, the first and second low-frequency signals are transmitted over a long distance through a low cost cable such as a twist pair cable.

When the frequency of a vertical synchronizing signal of the television camera 16 is f0, the frequency of the switching signal is f1, the frequencies of the first and second low-frequency signals are respectively f2 and f3, the frequency of the clock signal is f4, and n1, n2, n3 and n4 are the random integers equal to or larger than 1, their respective frequencies are selected as follows:

$$f1 = f0 \div 2^{n1}$$

$$f2 = f1 \times 2^{n2}$$

$$f3 = f2 \times 2^{n3}$$

and $$f4 = f3 \times 2^{n4}$$

In case of NTSC system, the vertical synchronizing signal is 60 Hz, and therefore, the respective frequencies are set as follows:

f1 = 30 Hz f2 = 960 Hz and f3 = 1920 Hz

The television camera 16 is a well-known television camera synchronized by a frame synchronizing pulse having a level higher than the white level of a composite video signal, as described in U.S. Pat. No. 4,608,352, the contents of which are incorporated herein by reference.

Therefore, the television camera 16 comprises a comparison circuit 32 for comparing the voltage level of the frame synchronizing pulse fed from the external synchronizing converter apparatus 10 through the cable 22 with a reference voltage V1 and generating a pulse signal when the frame synchronizing pulse equal or higher than the reference voltage V1, an internal synchronizing generator 34 for receiving the pulse signal outputted from the comparison circuit and generating an internal synchronizing signal synchronized with the received pulse signal, and a video signal generating circuit 36 for generating a video signal.

One terminal of the comparison circuit 32 is connected to the cable 22, and the other terminal of the comparison circuit 32 is connected to a reference voltage source 38. The reference voltage V1 of the reference voltage source 38 has a level higher than the white level of the composite video signal, preferably a level approximately equal with the frame synchronizing pulse level.

The internal synchronizing generator 34 generates horizontal and vertical synchronizing signals on the basis of the pulse signal outputted from the comparison circuit 32. The video signal outputted from the video signal generating circuit 36 is fed to the synchronizing signal converting apparatus 10 through the cable 22.

The external synchronizing converter apparatus 10 comprises a decoder circuit 52 for decoding the signal corresponding to the alternating rate of the first and second low-frequency signals, i.e., the switching signal shown in FIG. 2(A), on the basis of the first and second low-frequency signals fed to a terminal 50 through the cable 20, and a pulse shaping and output circuit 54 for forming and generating two pulse signals P1 and P2 corresponding to a predetermined width and level and timed with the leading edge of the decoded switching pulse signal shown in FIG. 2(A).

The phase of the pulse signals P1 and P2 are corresponding to the vertical blanking interval of the composite video signal, as shown in FIGS. 2(E) and 2(F), and at the same time the pulse signals P1 and P2 are generated every second vertical field synchronizing signals. Further, the frame synchronizing pulse signal P1 has a level higher than the white level of the composite video signal, as shown in FIG. 2(E).

The adding circuit 56 is connected to a terminal 60 for receiving the video signal fed from the television camera 16 through the cable 22, and injects the frame synchronizing pulse P1 into the video transmission line connected to the terminal 60. Therefore, the video signal fed to the terminal 60 results in a signal shown in FIG. 2(E), into which the pulse signal P1 is injected within the period corresponding to the vertical blanking interval.

Figure 2:
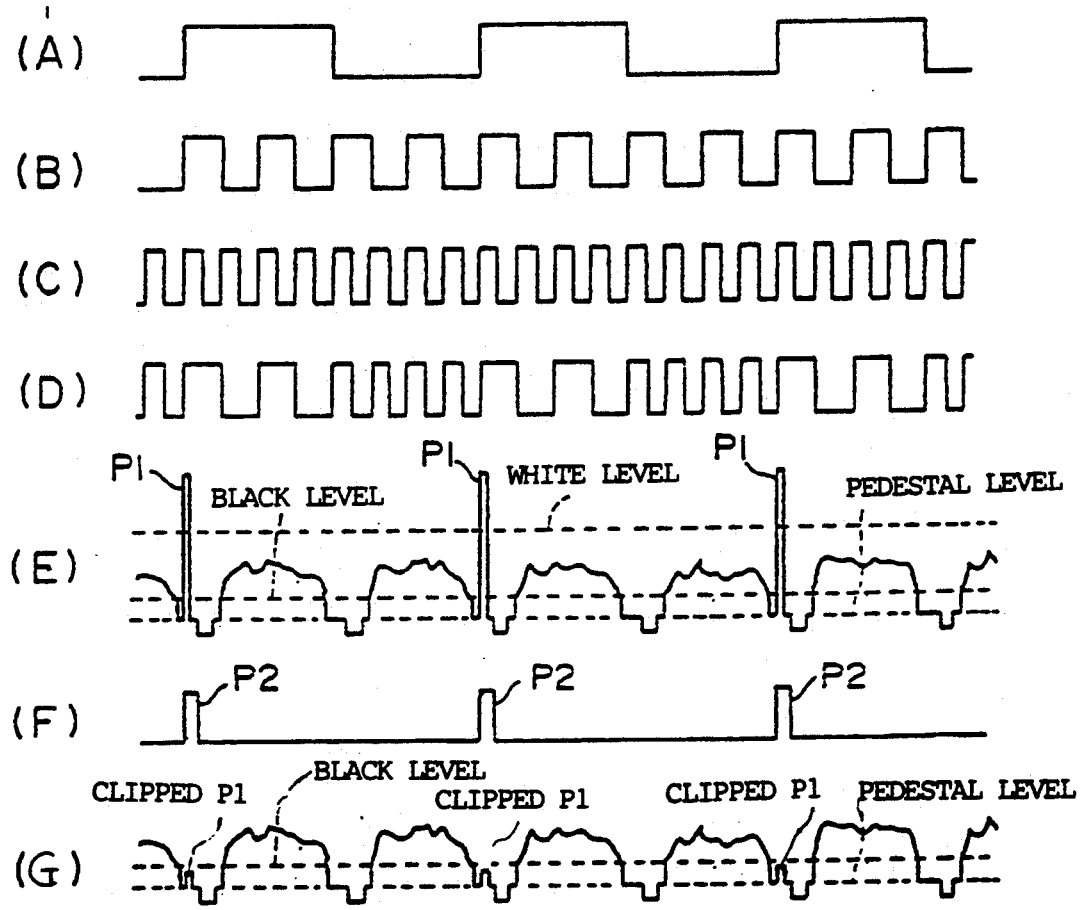
FIG. 2 shows the wareform of electric signals in the apparatus shown in FIG. 1.

The clipping circuit 58 clips the signal of a portion, which corresponds to the pulse signal P1, in the composite signal outputted from the adding circuit 56, to below the black level of the composite video signal shown in FIG. 2 (G). Therefore, the pulse P1 is removed from the video signal fed to terminal 62 and will not influence the television monitor 12 which is connected to the terminal 62 through the video transmission line 18.

By this, even if any pulse signal P1 is included in the video signal fed to the clipping circuit 58, the pulse signal P1 is essentially removed by the clipping circuit 58, so that the video signal outputted from the clipping circuit 58 does not include any pulse signal P1.

The adding circuit 56 may be an injection circuit using well known technique of mixing signals by employing readily available ICs, or by employing discrete circuit using transistors, resistors and diodes. Thus, the signal of the terminal 60 results in a composite video signal fed to the terminal 60 mixed with the frame synchronizing pulse. Therefore, the composite video signal mixed with the frame synchronizing pulse is fed to the comparison circuit 34 of the television camera 16.

Instead of using the adding circuit 56 and the clipping circuit 58, the frame synchronizing pulse signal P1 may be outputted directly to the comparison circuit 32 of the television camera 16.

In case the television camera 16 is not provided with the comparison circuit 32, the comparison circuit 32 and the reference voltage source 38 may be attached to the external synchronizing converter apparatus 10, or otherwise the pulse signal P1 or P2 may be outputted to the internal synchronizing generator 34 of the television camera 16. In the latter case, the adding circuit 56 and the clipping circuit 58 are not needed.

In case the television camera 16 is synchronized by the horizontal and vertical synchronizing signal or the horizontal and vertical drive signals, a generation circuit for the horizontal and vertical synchronizing signals or the horizontal and vertical drive signals may be disposed, instead of the pulse shaping and output circuit 54. In this case, the adding circuit 56 and the clipping circuit 58 are not needed.

It should be noted that the parts of the television camera and the synchronizing signal generator which are known have not been described in detail herein because they are disclosed in the referenced patents.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for converting at least two repeatedly alternating frequency signals into a new synchronizing pulse for synchronizing a television camera of a plurality of television cameras to be synchronized with one another, wherein each camera includes means for generating a composite video signal, the method comprising the steps of:
   receiving said repeatedly alternating frequency signals from means for generating said alternating frequency signals;
   decoding an alternating rate of said signals on the basis of said at least two frequency signals to produce a decoded signal and generating on the basis of said decoded signal a frame synchronizing pulse having a level higher than the while level or lower than the black level of the composite video signal generated by said television camera; and
   injecting said frame synchronizing pulse into a video transmission line connected to said television camera for synchronizing said television camera on the basis of the injected frame synchronizing pulse.

2. An apparatus for converting at least two repeatedly alternating frequency signals into a new synchronizing pulse signal for synchronizing a television camera of a plurality of television cameras to be synchronized with one another, wherein each camera includes a generating circuit for generating a composite video signal, the apparatus comprising:
   first signal processing means receiving said repeatedly alternating frequency signals from means generating said alternating frequency signals and decoding an alternating rate of said signals on the basis of said at least two frequency signals to produce a decoded signal; and
   second signal processing means receiving said decoded signal and generating said new synchronizing pulse signal for synchronizing the television camera on the basis of the decoded signal.

3. A signal converting apparatus according to claim 2, and further comprising third signal processing means receiving said pulse signal and generating, on the basis of the received pulse signal, a frame synchronizing pulse having a level higher than the white level or lower than the black level of the composite video signal of said television camera.

4. A signal converting apparatus according to claim 3, and further comprising forth signal processing means receiving a video signal transmitted from said television camera and injecting said frame synchronizing pulse into the received video signal within a period corresponding to a vertical blanking interval in said composite video signal.

5. A signal converting apparatus according to claim 4, and further comprising fifth signal processing means receiving a signal outputted from said third signal processing means and clipping and removing said frame synchronizing pulse from the received signal.

* * * * *